(No Model.)
G. W. GULLEDGE.
SKIMMER.
No. 391,894. Patented Oct. 30, 1888.
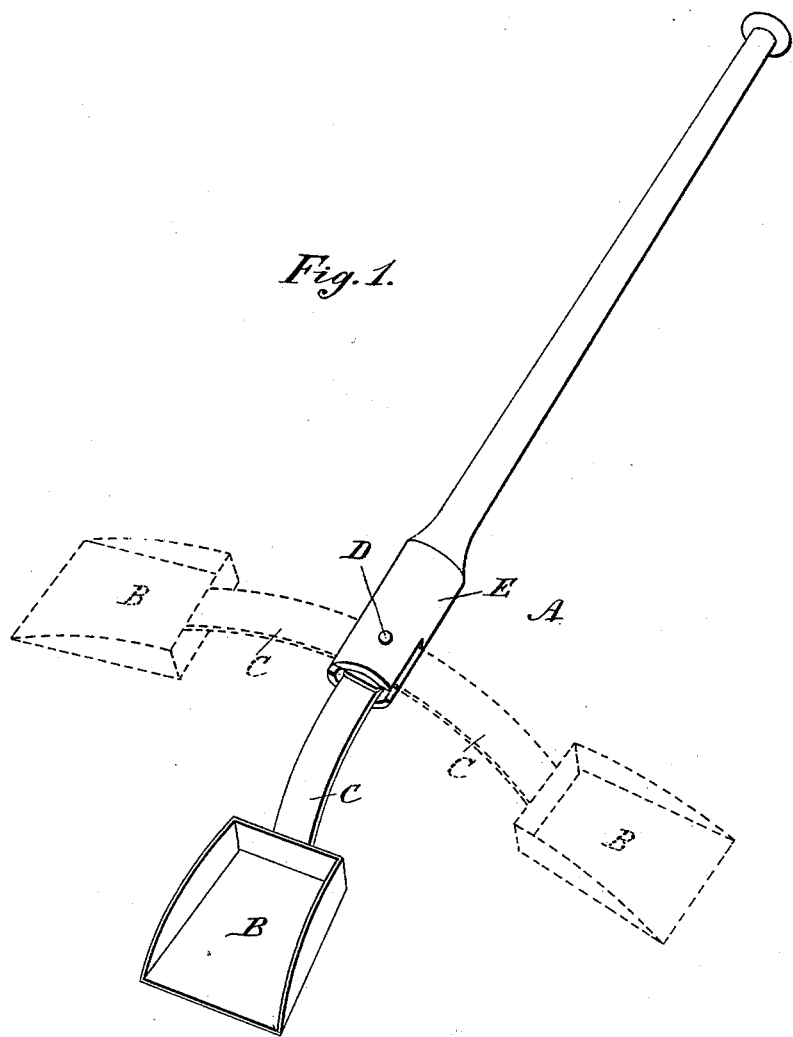
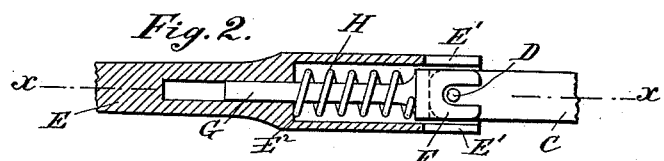
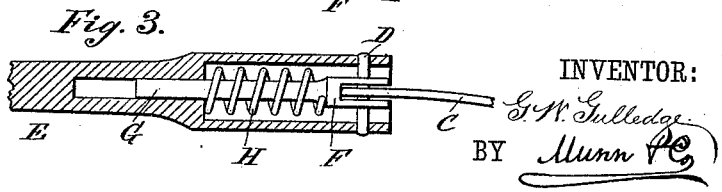
WITNESSES:
D. C. Reusch
C. Sedgwick
INVENTOR:
G. W. Gulledge
BY Munn & Co.
ATTORNEYS.

UNITED STATES PATENT OFFICE.

GEORGE W. GULLEDGE, OF BRIARTOWN, INDIAN TERRITORY.

SKIMMER.

SPECIFICATION forming part of Letters Patent No. 391,894, dated October 30, 1888.

Application filed April 18, 1888. Serial No. 271,066. (No model.)

*To all whom it may concern:*

Be it known that I, GEORGE W. GULLEDGE, of Briartown, Cherokee Nation, Indian Territory, have invented a new and Improved Skimmer, of which the following is a full, clear, and exact description.

The object of the invention is to provide a new and improved skimmer specially adapted for skimming sorghum while undergoing the usual boiling process.

The invention consists of a pan secured to a handle fulcrumed on a pivot secured to an extension-rod and of a slotted fork held on the said pivot and pressed against the end of the said handle by a spring coiled on a rod extending from the said fork.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of the skimmer. Fig. 2 is an enlarged sectional plan view of the joint. Fig. 3 is a sectional side elevation of the same on the line *x x* of Fig. 2.

The improved skimmer A is provided with a pan, B, from the back of which extends the handle C, fulcrumed on the pivot D, held in the hollow slotted end of the extension-rod E. On the end of the handle C fits the fork F, held in the hollow of the rod E, and having slots through which passes the pivot D, and from the rear of the fork F extends a rod, G, having its bearing in the extension-rod E, as plainly shown in Figs. 2 and 3. A spring, H, is coiled on this rod G and rests with one end against the shoulder E², formed in the hollow end of the extension-rod E, and with its other end presses against the fork F, so as to force the back of the latter firmly in contact with the end edge or side edges of the handle C.

When the skimmer is in the position as shown in full lines in Fig. 1, then the pan B and its handle C extend in line with the extension E, held in the hands of the operator. In this position the skimmer is used for straight-forward skimming; but when the operator desires to reach a corner or to skim to one side of the pan in which the sorghum is treated, then the operator gives the handle C one-quarter turn either to the right or the left, as the case may be, so that the handle C and pan B stand at right angles to the extension-handle E, as shown in dotted lines in Fig. 1. When the handle C is moved into this position, then the fork F exerts a pressure against the side edges of the handle C, and thus holds the latter in position. The fork F is slightly moved backward and forward when changing the position of the handle C, and the said fork is guided in this movement by fitting snugly into the slots E' of the rod E.

Having thus described my invention, what I claim as new, and desire to secure by Letters Patent, is—

1. In a skimmer, the combination, with a pan provided with a handle, of an extension-rod to which the handle of the pan is pivoted, having a hollow and slotted end, and a spring-pressed follower in the extension-rod for engaging the side or end of the handle of the pan, substantially as described.

2. A skimmer attachment consisting of a rod having a hollow and slotted end and provided with a pivot-pin in said end, a fork in the hollow end of the said rod and having slots at right angles to the prongs of the fork, and a spring surrounding the shank of the said fork, substantially as herein shown and described.

3. In a skimmer, the combination, with the extension-rod E, having the slots E', and the pivot-pin D, of the handle C, pivoted on the pin D, the pan B, secured to the handle C, the fork F, fitting onto the handle C, the rod G, projecting from the said fork F, and the spring H, coiled on the rod G and pressing the said fork F in contact with the said handle C, substantially as described.

GEORGE W. GULLEDGE.

Witnesses:
ISAAC MOONEY,
IRVING VOSE.